United States Patent [19]
Cholet

[11] 4,077,262
[45] Mar. 7, 1978

[54] SLAVED PRESSURE TRANSDUCER

[75] Inventor: Jean Cholet, Villeneuve-Loubet, France

[73] Assignee: Texas Instruments Incorporated, Dallas, Tex.

[21] Appl. No.: 737,459

[22] Filed: Nov. 1, 1976

[30] Foreign Application Priority Data

Nov. 4, 1975 France .................. 75 33633

[51] Int. Cl.² .............................................. G01L 9/10
[52] U.S. Cl. ....................................... 73/701; 73/722; 73/729
[58] Field of Search ............ 73/398 R, 410, 406, 73/386, 387; 318/645, 653

[56] References Cited

U.S. PATENT DOCUMENTS

| 2,511,752 | 6/1950 | Tandler et al. ............... 73/398 R |
| 3,286,528 | 11/1966 | Jullien-Davin ............... 73/398 R |
| 3,884,079 | 5/1975 | Turtle et al. ............... 73/398 R |
| 3,906,799 | 9/1975 | Wallman et al. ............... 73/410 |
| 3,908,460 | 9/1975 | Lichowsky ............... 73/398 R |

Primary Examiner—Donald O. Woodiel
Attorney, Agent, or Firm—Richard L. Donaldson; James T. Comfort

[57] ABSTRACT

Servo pressure pickup comprising a sealed housing having a pressure inlet and in which is mounted an anaroid capsule one wall of which is mechanically linked to an electrical displacement measuring device. The current feed of an electromagnet is controlled by the measuring device. The electromagnet includes a movable core interposed between the capsule and the displacement measuring device. The electromagnet is designed to generate a force in opposition to that produced by the expansion of the capsule and proportional to the feed current of the electromagnet from the measuring device. The displacement measuring device may be amplified and used to generate an analog or a digital pressure measurement output signal.

12 Claims, 5 Drawing Figures

SLAVED PRESSURE TRANSDUCER

The present invention relates to pressure pickups and relates more particularly to a servo pressure pickup.

It envisages in particular a pressure pickup of low cost and reliable operation which will be, in particular, well adapted for measuring the intake pressure of an internal combustion motor, this parameter being useful in operation of electronic ignition and injection devices.

The invention provides a servo pressure pickup comprising a sealed housing having a pressure connection, and in which there is mounted an aneroid capsule, one wall of which is linked mechanically to an electronic device which measures displacements, an electromagnet whose feed is controlled by the measuring device and having a movable core interposed between the said capsule and the displacement measuring device, the said electromagnet being designed to generate a force antagonistic to that produced by the expansion of the capsule, and proportional to the feed current of the electromagnet.

Other characteristics and advantages of the invention will appear in the course of the following description of an embodiment of the invention illustrated by the drawings, given solely by way of example, in which.

Figure 1:
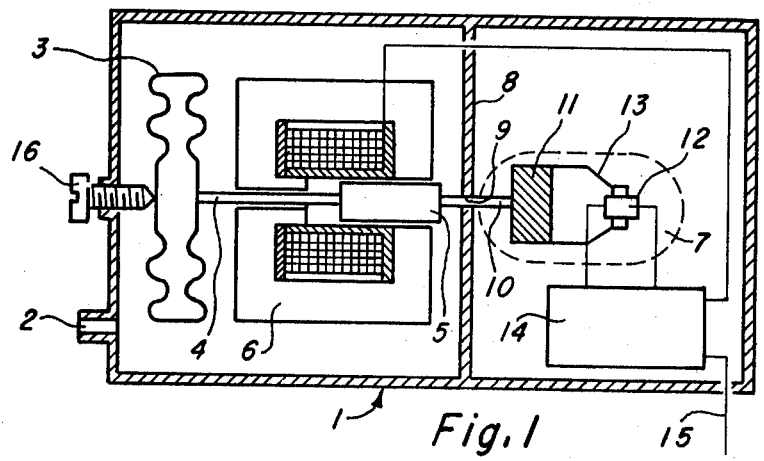
FIG. 1 is a schematic view of a pressure pickup embodying the invention.

The pressure pickup illustrated in FIG. 1 includes a sealed housing 1 provided with a connection 2 for admission into the housing of a gas whose pressure is to be measured.

In housing 1 there is mounted an aneroid capsule 3 which is linked mechanically by an axial rod 4 to one end of a core 5 of an electromagnet 6. The other end of the core 5 is linked mechanically to a device 7 which measures displacements and which is separated from the capsule 3 by a partition 8 having an orifice 9 for the passage of link rod 10 between core 5 and the displacement measuring device 7. The latter comprises a permanent magnet 11, a Hall-effect differential element 12 placed between two magnetic poles 13 of the magnet, only one of which is represented. The differential element 12 is connected to an electronic circuit 14 which is connected to the electromagnet 6 and which also has an output 15.

Capsule 3 is adjusted by a set screw 16 fixed to housing 1, and whose point comes in contact with the wall of the capsule opposite the rod 4. Screw 16 serves to adjust the zero of the device because of mechanical errors due to manufacturing tolerances.

Figure 2:
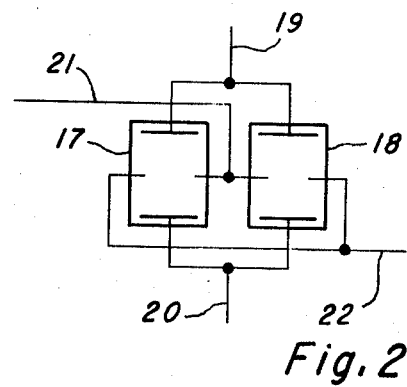
FIG. 2 is a sketch showing a Hall-effect differential element used in the pickup shown by FIG. 1.

The Hall-effect differential element 12 of the displacement measuring device 7 is represented in FIG. 2. It comprises two separate Hall cells 17 and 18 which are connected in parallel, as far as their feed is concerned, to terminals 19 and 20. But the two cells 17 and 18 are connected in opposition by their measuring terminals 21 and 22. As a result of this assembly, when the magnetic flux is identical in cells 17 and 18, output signals from the latter are of equal amplitudes but opposite in direction, and cancel one another out.

When an imbalance arises between the values of the magnetic fluxes in the two cells, the output signal from one of them increases to the detriment of that from the other, and the resulting signal can be used as an error signal.

Figure 3:
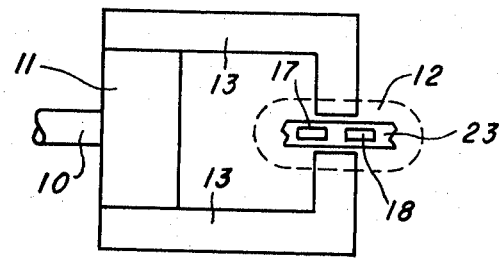
FIG. 3 is a detailed view of a device for measuring the displacement of the pickup in FIG. 1.

The displacement measuring device represented in FIG. 3 comprises the permanent magnet 11 disposed between two magnetic poles 13 and equipped with the rod 10 for linkage with the core 5 of electromagnet 6. The Hall-effect differential element 12 is disposed between poles 13 and therefore lies in the magnetic flux provided by magnet 11 and concentrated by pole pieces 13. The Hall-effect element 12 is constituted by a semiconductor element 23 in which the Hall cells 17 and 18 are provided by diffusion of impurities.

The electronic circuit 14 which forms part of the pickup can assume two different forms according to whether it is desired to obtain analog or digital signals at the output 15 of the pickup.

Figure 4:
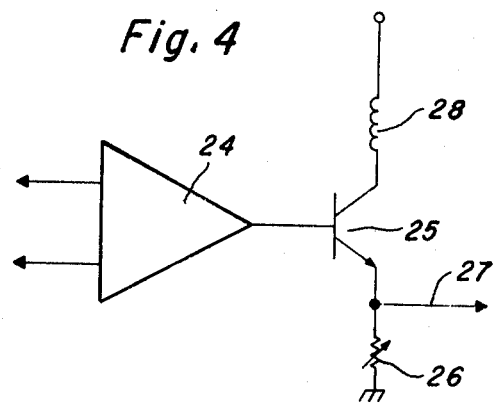
FIG. 4 is an electrical schematic of an analog embodiment of an output circuit of the pickup.

In FIG. 4 an analog output circuit 14 is shown which comprises an operational amplifier 24 whose inputs are connected to the outputs 21,22 respectively of the Hall cells, and whose output is connected to the base of an emitter follower NPN power transistor 25. The emitter of transistor 25 is connected to the ground through a variable resistor 26. The junction point of the emitter of the transistor and of resistor 26 forms the output 27 of the pickup. The collector of transistor 25 is connected to the winding 28 of the electromagnet 6 (FIG. 1).

In the circuit of FIG. 4, the resistor 26 is a simple variable resistor. However, it can be constituted by fixed resistors, variable resistors and thermistors connected together, suitably in series, in which case the output signal from the circuit represents a pressure compensated by the temperature, hence a mass of gas.

Figure 5:
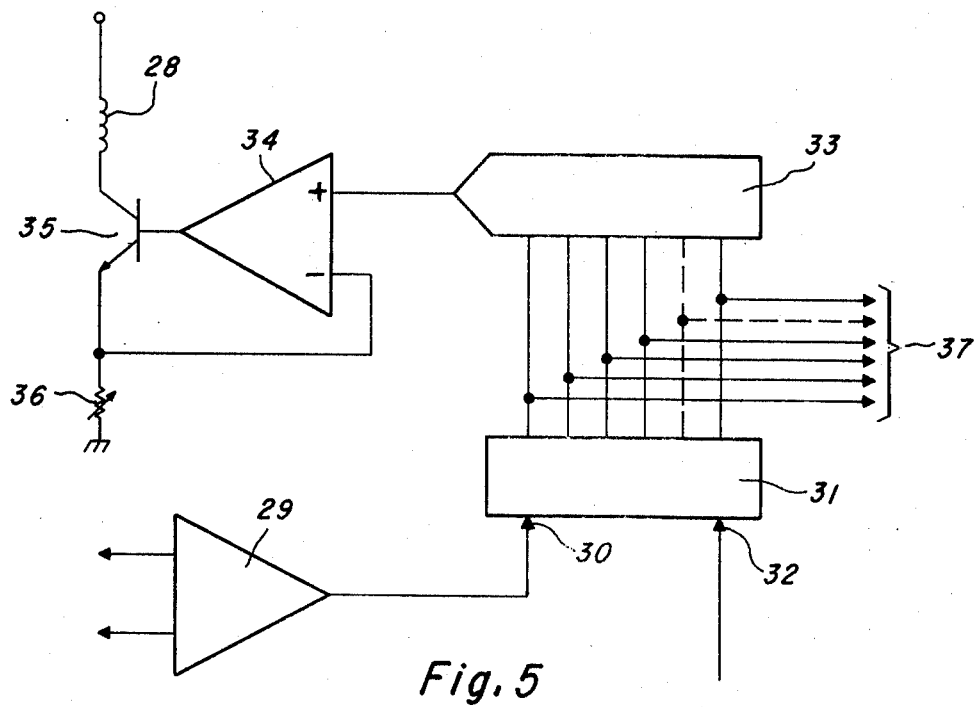
FIG. 5 is an electrical schematic of a digital embodiment of an output circuit of the pickup.

In FIG. 5 a digital output circuit is shown which comprises a comparator 29 whose inputs are connected to the outputs 21,22 respectively of the Hall cells and whose output is coupled to a first incrementing/decrementing input 30 of a reversible counter 31 that has a second clock input 32. Counter 31 has outputs connected to a digital-analog converter 33 whose analog output is connected to the non-inverting input of a differential amplifier 34. The output of amplifier 34 is connected to the base of an NPN emitter follower power transistor 35 whose emitter is connected to the ground through a variable resistor 36 and whose collector is connected to the winding 28 of electromagnet 6. Between the counter 31 and converter 33, the circuit comprises outputs 37 at which appears the digital outputs of the circuit.

The pickup just described operates as follows.

Assume that a pressure, for example a negative one, is applied to inlet 2, and therefore prevails in housing 1 of the pickup. The side of aneroid capsule 3 which is not held by adjusting screw 16, tends to expand and push to the right, by means of rod 4, the core 5 of electromagnet 6 as well as the displacement measuring device 7.

Since, initially, the Hall-effect differential element 12 was in the airgap defined by pole pieces 13, in a position such that the output signals of the two Hall cells 17 and 18 balanced one another out, the displacement of magnet 11 and pole pieces 13, due to the expansion of capsule 3, creates an imbalance in the ouput signal of the Hall-effect differential element 12. This imbalance signal, after processing in the electronic circuit 14, causes the application of a current to the winding 28 of electromagnet 6 which in turn generates a force that displaces core 5 in the direction opposite to that of the displacement caused by the expansion of capsule 5, and thus cancels this displacement. By the selection of a sufficient airgap for the electromagnet, an electromagnet coil current proportional to the pressure applied to the pickup will be obtained.

In the case of FIG. 4, the analog value of this current is available at the output 27 of transistor 25.

In the circuit in FIG. 5, this value is available in digital form at terminals 37.

Given that the displacements are practically zero, the aneroid capsule has no need to be very precise, and it is enough for it to be very sensitive. For the same reason it is unnecessary to provide a frictionless sliding passage to hold the moving linkage of the pickup. Only a flexible maintenance device (not shown) is provided to reduce the movement of the linkage and hence the hysteresis.

The pressure pickup just described is a pickup of good quality and low cost. It can be adapted to the measurement of positive, negative, absolute or differential pressures by a simple displacement of core 5 of the electromagnet and/or the pressure connection.

The Hall-effect displacement measuring device 12 and the electronic circuit 14 can be embodied in one and the same integrated circuit.

The chamber delimited by housing 1, partition 8 and connection 2 functions as a filter to reduce rapid variations of the pressure which, in the case of the measurement of the intake pressure of an internal combustion motor, are caused by the opening and closing of the valves of the motor.

What is claimed is:

1. Servo pressure pickup apparatus comprising a sealed housing having pressure inlet means, aneroid capsule means mounted in said housing in communication with said inlet means; electromagnet means in said housing; physical displacement measuring means disposed in said housing for generating an electrical displacement signal corresponding to the pressure being measured; electronic circuit means in said housing for electrically coupling said displacement signal to said electromagnet means; said electromagnet means including core member means coupled to a wall of said capsule means and to said displacement measuring means for movement thereof in one sense in response to movement of said wall of said capsule means to cause said displacement measuring means to generate a displacement signal coupled by said electronic circuit to said electromagnet means for generation of a force causing movement of said core member means in an opposite sense; wherein said displacement measuring means comprises a Hall-effect differential device located in an air gap defined between two pole pieces of permanent magnet means in said housing, said wall movement of said capsule means causing relative displacement between said differential device and said pole pieces.

2. Pickup apparatus according to claim 1, wherein the permanent magnet means is coupled to said core member means; and wherein said differential device is mounted fixedly in said housing.

3. Pickup apparatus according to claim 1, wherein said housing includes a partition between said electromagnet means and said Hall-effect differential device.

4. Pickup apparatus according to claim 1, wherein said Hall-effect differential device comprises two Hall-effect cells having feed terminals connected in parallel and having outputs connected in opposition.

5. Pickup apparatus according to claim 4, wherein said Hall-effect cells comprise doped impurity regions in a semiconductor body.

6. Pickup apparatus according to claim 5, wherein said Hall-effect cells and said electronic circuit are embodied in a common integrated circuit.

7. Pickup apparatus according to claim 1, wherein said electronic circuit means includes an operational amplifier having inputs connected to outputs of said Hall-effect differential device and having an output connected to a power transistor stage having a collector-emitter circuit connected to feed a winding of said electromagnet means and connected in series with an adjustable load resistor means for producing an analog pressure measurement signal.

8. Pickup apparatus according to claim 1, wherein said electronic circuit means includes a comparator having inputs connected to outputs of said Hall-effect differential device and having an output connected to an input of an up-down counter; digital-analog converter means connected between digital outputs of said up-down counter and a power transistor stage having a collector-emitter path connected to feed a winding of said electromagnet means; said counter output providing a digital pressure measurement signal.

9. Pickup apparatus according to claim 1, including zero adjustment means comprising a movable member mounted in a wall of said housing and bearing on a wall of said aneroid capsule means opposite said wall to which said core member means of said electromagnet is coupled.

10. Servo pressure pickup apparatus comprising a sealed housing having pressure inlet means, aneroid capsule means mounted in said housing in communication with said inlet means; electromagnet means in said housing; physical displacement measuring means comprising a Hall-effect differential device located in an air gap defined between pole pieces of permanent magnet means in said housing for generating an electrical displacement signal corresponding to the pressure being measured; semiconductor integrated electronic circuit means in said housing for electrically coupling said displacement signal to said electromagnet means; said electromagnet means including core member means coupled to a wall of said capsule means and to said Hall-effect differential device for movement thereof in one sense in response to movement of said wall of said capsule means to cause relative displacement between said Hall-effect differential device and said pole pieces to generate a displacement signal coupled by said electronic circuit to said electromagnet means for generation of a force causing movement of said core member means in an opposite sense; and wherein said Hall-effect differential device comprises two Hall-effect cells comprising doped impurity regions in said integrated circuit structure; said Hall-effect cells having feed terminals connected in parallel and having outputs connected in opposition to provide respective inputs to said electronic circuit.

11. Pickup apparatus according to claim 10, wherein said electronic circuit means further includes means for producing an analog pressure measurement signal.

12. Pickup apparatus according to claim 10, wherein said electronic circuit means further includes means for producing a digital pressure measurement signal.

* * * * *